United States Patent [19]
Hashimoto et al.

[11] Patent Number: 5,745,878
[45] Date of Patent: Apr. 28, 1998

[54] BUSINESS REQUIREMENT HANDLING APPARATUS

[75] Inventors: Keiji Hashimoto; Yasuyuki Fujikawa; Akihiko Yoshioka; Jun Ginbayashi; Kazuo Yabuta; Yukio Imazu, all of Kawasaki, Japan

[73] Assignee: Fujitsu Limited, Kawasaki, Japan

[21] Appl. No.: 419,768

[22] Filed: Apr. 10, 1995

Related U.S. Application Data

[63] Continuation of Ser. No. 177,856, Jan. 5, 1994, abandoned.

[30] Foreign Application Priority Data

Feb. 23, 1993 [JP] Japan .................................. 5-032347

[51] Int. Cl.$^6$ .............................. G06F 17/60; G06F 17/30
[52] U.S. Cl. ...................... 705/1; 705/7; 705/8; 705/9; 705/11; 395/702; 395/611; 395/613; 395/615; 707/100; 707/102; 707/104
[58] Field of Search .................... 364/401 R, 402; 395/600, 650, 700, 201, 207, 208, 209, 211, 611, 612, 613, 614, 615, 701, 702, 703, 712; 705/1, 7, 8, 9, 11

[56] References Cited

U.S. PATENT DOCUMENTS

| | | | |
|---|---|---|---|
| 5,128,871 | 7/1992 | Schmitz | 364/490 |
| 5,193,182 | 3/1993 | Bachman et al. | 395/600 |
| 5,212,771 | 5/1993 | Gane et al. | 395/160 |
| 5,216,592 | 6/1993 | Mann et al. | 395/208 |
| 5,233,513 | 8/1993 | Doyle | 364/401 R |
| 5,241,645 | 8/1993 | Cimral et al. | 395/500 |
| 5,249,300 | 9/1993 | Bachman et al. | 395/800 |
| 5,390,330 | 2/1995 | Talati | 395/700 |
| 5,450,545 | 9/1995 | Martin et al. | 395/701 |
| 5,459,860 | 10/1995 | Burnett et al. | 395/612 |
| 5,535,389 | 7/1996 | Elder et al. | 395/712 |

FOREIGN PATENT DOCUMENTS

| | | |
|---|---|---|
| 1-147621 | 6/1989 | Japan . |
| 4-135235 | 5/1992 | Japan . |
| 4-169968 | 6/1992 | Japan . |

OTHER PUBLICATIONS

Dialog File 621, Acc. No. 00181653: "Bachman Introduces Revolutionary Case Products", Jan. 26, 1988, New Release, Cambridge, Mass., Jan. 26, 1988.

Dialog File 148, Acc. No. 04087201: "Repository Manager/MVS is the Core of IBM's AD/Cycle", *Computer Gram International*, N. 1267, C6ID9200001, Sep. 20, 1989.

*Primary Examiner*—Gail O. Hayes
*Assistant Examiner*—Joseph Thomas
*Attorney, Agent, or Firm*—Staas & Halsey

[57] ABSTRACT

A business requirement handling apparatus is adapted to a data processing system which includes a central processing unit, a display unit and an input unit. The business requirement handling apparatus is provided with a business requirement database accumulating and managing business requirements of businesses to be programmed depending on a substrate indicating predetermined data types and relations thereof, business requirement editing process device displaying business requirements on display unit to perform editing process and storing edited business requirements in business requirement database in units of individual data types, where each of business requirements are described in the form of a restricting expression which restricts input data if a processing content is formed of input items, described in the form of a calculation expression for obtaining output data if the processing content is formed of output items, and added with a conditional expression if a necessary condition exists, a contradiction detecting process device detecting existence of contradictions among the business requirements stored in business requirement database based on attributes including restricting expression, calculation expression or conditional expression annexed to items of business requirements, and notifying a user of content of contradiction when contradiction is detected, and a program synthesizing process device generating program parts from requirements of each item based on business requirements stored in business requirement database, and generating business program which is executable in a user environment by synthesizing the program parts with a given control logic.

7 Claims, 9 Drawing Sheets

50 SCREEN

| INPUT RECORD DEFINITION | | BIRTH REPORT |
|---|---|---|
| ITEM NAME | RESTRICTION | CONDITION |
| SEX | = MALE | RELATION = ELDEST SON |
|  | = FEMALE | RELATION = YOUNGER SISTER |
| BIRTH DATE | ≤ BIRTH DATE + 14 |  |

FIG.8

<REQUIREMENT>  "BIRTH REPORT CHECK"  ⎡ 80

| ITEM NAME | RESTRICTION | CONDITION |
|---|---|---|
| REPORT DATE | ≦ BIRTH DATE + 14 | CLASSIFICATION = NORMAL |
| SEX | = MALE | RELATION = ELDEST SON |
|  | = FEMALE | RELATION = YOUNGER SISTER |

⇩  ⎡ 81

```
─── PROGRAM PARTS "BIRTH REPORT CHECK" ─── if CLASSIFICATION = NORMAL
      then
         if REPORT DATE ≦ BIRTH DATE + 14
           else ERROR if RELATION = ELDEST SON
      then
         if SEX = MALE
           else ERROR if RELATION = YOUNGER SISTER
      then
         if SEX = FEMALE
           else ERROR
```

BUSINESS REQUIREMENT HANDLING APPARATUS

This application is a continuation of application Ser. No. 08/177,856, filed Jan. 5, 1994, now abandoned.

BACKGROUND OF THE INVENTION

The present invention generally relates to business requirement handling apparatuses, and more particularly to a business requirement handling apparatus-applicable to a data processing system for supporting programming which is primarily aimed at business data processing. The business requirement handling apparatus detects contradiction and synthesizing the program based on business requirements (or business specifications) which are declaratively described, so as to facilitate modification and reuse of existing business requirements.

Generally, according to conventional programming support techniques, the program specification is described by procedures which are to be executed, and a step-wise refinement is made to obtain a final program. The specification and the program are managed by functional units such as functional processing modules, and the management and retention are merely carried out in a form which enables understanding of the relation between the functional units and input/output data. Accordingly, in order to find out what kind of processes are carried out with respect to the individual data, a technique is required to analyze the entire program and to trace the processes with respect to the data.

In the conventional procedural requirement (or specification) the processes with respect to the data are described by a series of procedures, and the processes with respect to the same data are scattered in the requirement. For this reason, if the handling with respect to certain data is modified, for example, the maintenance person is expected to judge the parts to be modified and to correctly make the modifications. As a result, the efficiency of the maintenance is deteriorated due to the burden on the maintenance person to judge the parts to be modified and to correctly make the modifications.

On the other hand, in order to improve the efficiency of developing the business transaction which mainly handles form data, a method has been proposed to recognize-the data structures from the formats of a plurality of kinds of form data groups and to generate the business transaction requirements according to the data structures. Such a method is proposed in a Japanese Laid-Open Patent Application No.4-169968. According to this proposed method, the reference/update relationship of the data groups is extracted to recognize the data structure of the form data group having this relationship, and the business transaction requirement is generated according to the structure by matching the structures if a mismatch occurs among the structures.

However, this proposed method does not have the concept of abstract data type, and the structure does not enable the business requirement being handled to give attributes to the individual data types. For this reason, it is only possible to detect the match or mismatch of the structure solely from the reference/update relationship of the individual data, and it is difficult to detect contradictions among the requirements for complicated conditions and the like. Accordingly, when reusing the requirement which is made in another business of the same kind and modifying a portion of the requirement so as to make a new business requirement, for example, the developing person must extensively check whether or not the modification is correct and whether or not contradictions occur in the requirement. Therefore, great difficulties are encountered when reusing the non-procedural declaration used in the existing business.

SUMMARY OF THE INVENTION

Accordingly, it is a general object of the present invention to provide a novel and useful business requirement handling apparatus in which the problems described above are eliminated.

Another and more specific object of the present invention is to provide a business requirement handling apparatus which describes and accumulates business requirements as attributes of data types, and adds a mechanism for enabling detection of contradictions in the structure, so that correction and reuse of business requirements among businesses of the same kind are facilitated.

Still another object of the present invention is to provide a business requirement handling apparatus adapted to a data processing system which includes a central processing unit, a display unit and an input unit, comprising a business requirement database accumulating and managing business requirements of businesses to be programmed depending on a structure which indicates predetermined data types and relations thereof, business requirement editing process means for displaying business requirements on the display unit to carry out an editing process and for storing edited business requirements in the business requirement database in units of the individual data types, each of the business requirements being described in the form of a restricting expression which restricts input data if a processing content is made up of input items, described in the form of a calculation expression for obtaining output data if the processing content is made up of output items, and added with a conditional expression if a necessary condition exists, contradiction detecting process means for detecting whether or not contradictions exist among the business requirements stored in the business requirement database based on attributes including the restricting expression, the calculation expression or the conditional expression annexed to the items of the business requirements, and for notifying a user of a content of the contradiction when the contradiction is detected, and program synthesizing process means for generating program parts from the requirements of each item based on the business requirements stored in the business requirement database, and for generating a business program which is executable in a user environment by synthesizing the program parts with a given control logic. According to the business requirement handling apparatus of the present invention, it is possible to more easily judge static contradictions among the requirements, because the business requirements are accumulated in units of data types and are described by restrictions or expressions with respect to the data types. Particularly since it is possible to define the type (domain) which is common to the items which form the records, and the attributes such as the restrictions and expressions can be given also to such, it becomes possible to easily reflect the modifications in an abstract level to a large number of requirements. In addition, by inheriting the requirements from the upper layer to the lower layer, it is also possible to prevent the other parts from being affected by a modification of the processing requirement inherent in the lower layer.

Other objects and further features of the present invention will be apparent from the following detailed description when read in conjunction with the accompanying drawings.

BRIEF DESCRIPTION OF THE DRAWINGS

FIG. 8 is a diagram for explaining a conversion of requirements of each item into program parts.

DESCRIPTION OF THE PREFERRED EMBODIMENTS

First, a description will be given of the operating principle of the present invention, by referring to FIG. 1.

Figure 1:
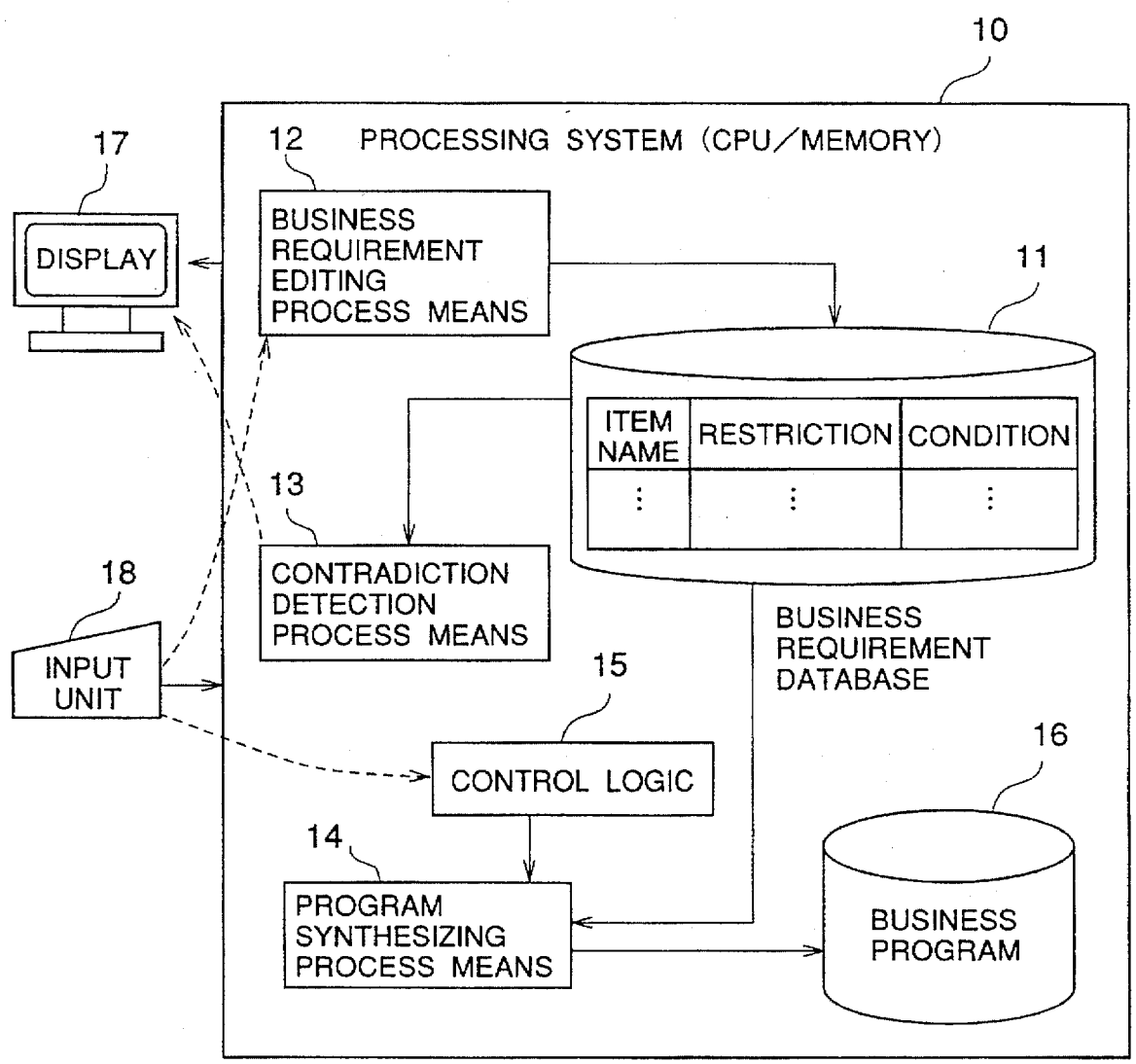
FIG. 1 is a system block diagram for explaining the operating principle of the present invention.

In FIG. 1, a processing system 10 includes a central processing unit (CPU), a memory and the like which form the various means shown. In other words, the processing system 10 includes a business requirement database 11 which stores business requirements which are made and edited, a business requirement editing process means 12 for editing the business requirements, a contradiction detection process means 13 for detecting contradictions among the business requirements, a program synthesizing process means 14 for synthesizing programs based on the business requirements, a control logic 15 which restricts the processing sequence and the like of the business requirements, a business program 16 which is generated, a display unit 17, and an input unit 18 such as a keyboard.

In the present invention, the business requirements are described in units of individual data types. More particularly, the business requirement is described in the form of a restricting expression which restricts the input data if the processing content is made up of input items, and is described in the form of a calculation expression for obtaining the output data if the processing content is made up of output items, and further, a conditional expression is added if a necessary condition exists. The business requirement editing process means 12 includes editing functions such as making, retrieving and correcting the business requirements. The business requirement editing process means 12 displays the business requirements on the display unit 17 to be subjected to the editing process, and stores the edited business requirements in the business requirement database 11.

The contradiction detecting process means 13 detects whether or not contradictions exist among the business requirements stored in the business requirement database 11, based on the attributes including the restricting expression, the calculation expression or the conditional expression annexed to the items of the business requirements. If a contradiction exists the contradiction detecting process means 13 notifies the user of the content of the contradiction.

The program synthesizing process means 14 generates program parts from the requirements of each item based on the business requirements stored in the business requirement database 11, and synthesizes the program parts with the control logic 15 which indicates the given processing sequence or the like, so as to generate the business program 16 which is executable in the user environment.

The business requirements handled in this case describe the attributes including the restricting expression, the calculation expression or the conditional expression which is annexed with respect to record items which form a record that is a data processing unit used in the programs, domains which are types used in common by the record items, and processing items which indicate the relation when the record items are processed in a certain program. The domains, the record items and the processing items conceptually represent an abstract data type in this sequence. The attributes of the requirements annexed to the domain are inherited to the record items and the processing items existing in the lower layer. In addition, the attributes of the requirements annexed to the record items are inherited to the processing items existing in the lower layer.

In the present invention, the data type is used as the basic structure in the business requirement database 11, and the requirements are managed depending on the non-procedural attributes annexed thereto. For this reason, it is easy to judge the static contradictions among the requirements, and the correction and reuse of the business requirements among businesses of the same kind are facilitated.

Figure 2A:
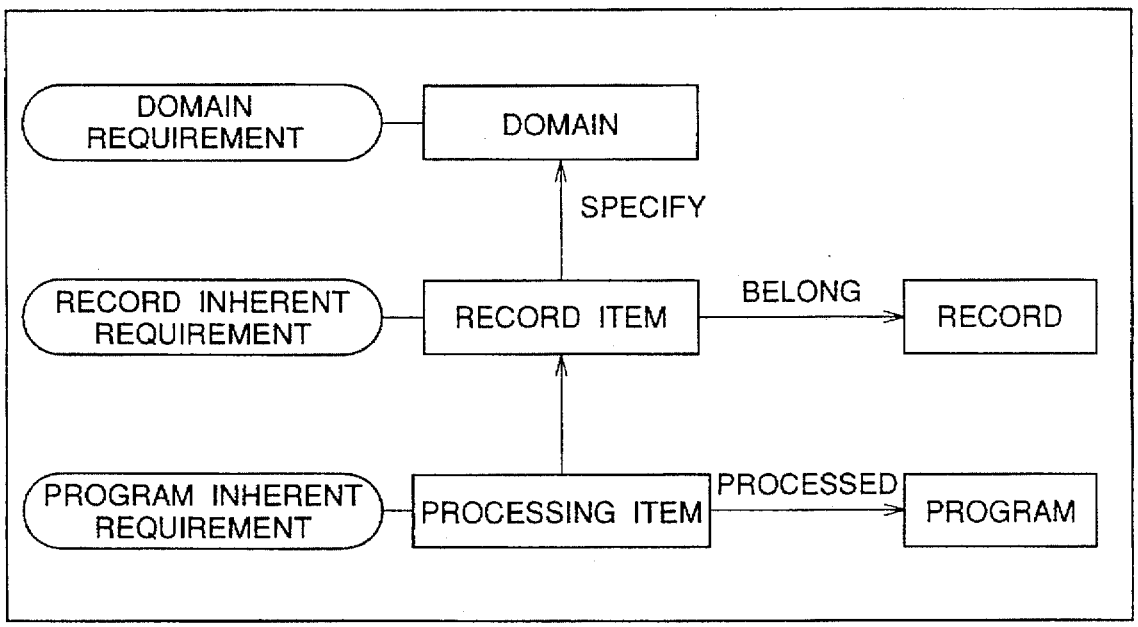
FIGS. 2A and 2B respectively are diagrams for explaining the structure of a business requirement database used in an embodiment of a business requirement handling apparatus according to the present invention.
Figure 2B:
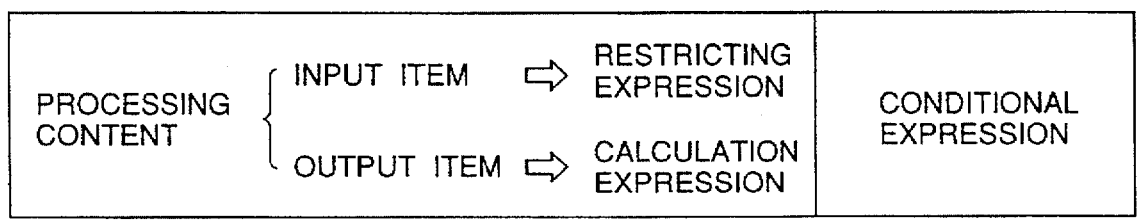

FIGS. 2A and 2B are diagrams for explaining the structure of the business requirement database used in an embodiment of a business requirement handling apparatus according to the present invention.

The business requirement database manages the business requirements as "requirements (attributes) annexed to the items", and includes no procedural information of the programs. The procedures of the programs may greatly differ depending on the conditions of the environment (hardware, operating system and the like) in which the programs are executed, the method of operating the programs (operating the screen) and the like. However, if only the static requirements with respect to the data are extracted, the requirements become approximately the same for the businesses of the same kind, and the reusage and portability of the requirements themselves improve. In the present invention, the requirements are further managed according to the following structure.

As shown in FIG. 2A, the domains, the record items and the processing items are handled as the data types, the data type is regarded as the basic structure, and the requirements are managed in the form annexed to the basic structure.

In FIG. 2A, a "record" is a data processing unit used in the program. For example, in businesses of a municipal office such as accepting birth reports and changing birth reports, a "birth report" record corresponds to this data processing unit. A "record item" is a data item forming the record. For example, "date of report", "birth date", "name of born child" and the like in the "birth report" record correspond to the record items. A "domain" is a type which is common among the record items. For example, "date of report" and "birth date" both specify the same domain "date". A "processing item" indicates a combination of the record items when the record items are processed in a certain program. For example, the processing item describes a relation which indicates that "date of report" is processed by a program "birth report accepting process".

The requirements in this embodiment are given in the form shown in FIG. 2B. In other words, the requirements are given by a combination of the processing content and the conditional expression and managed, for each of the domains, the record items and the processing items. The processing content is a "restricting expression" if the item is an input item, and is a "calculation expression" if the item is an output item. The expression is a format which is given depending on a predetermined grammar. The specific content of the grammar itself may be designed arbitrarily, and a detailed description thereof will be omitted in this specification.

Next, a description will be given of the inheritance of the requirements. The domains, the record items and the processing items conceptually represent the abstract data type in this sequence. The requirements annexed to each of the domains, the record items and the processing items have the mechanism of being inherited in the data types of the lower layer. For example, suppose that the following requirements exist.

Requirement of Domain "Date": "In Japanese Year";

Inherent Requirement of Record Item "Date of Report": "Not a Holiday";

Inherent Requirement of Processing Item "Report Date of Birth Report Accepting Process": "Within 14Days From Birth Date".

With respect to the above requirements, the actual process with respect to the "report date" of the program "birth report accepting process" inherits the requirements of the upper layer, that is, inherits the requirements "in Japanese year", "not a holiday" and "within 14 days from birth date". The programs are generated according to these requirements, as will be described later.

By employing the system of managing the requirements as described above, the following effects are obtainable.

First, a modification in an abstract level may be simultaneously reflected to a large number of requirements. For example, it is possible to simultaneously modify the requirements of all date items by simply modifying the requirements of the domain "date" with respect to a customer who uses the year in A.D.

Second, the modification of the inherent processing requirements does not affect other parts. For example, when the requirement "within 14 days from birth date" is given to the record item "date of report" and this record item is used for both "birth report accepting process" and "birth report modifying process", the process of "birth report accepting process" will be affected if a modification made in "birth report modifying process" does not conform to this restriction. But this may be prevented in a simple manner by making it a restriction of the processing item in the lower layer.

Figure 3:
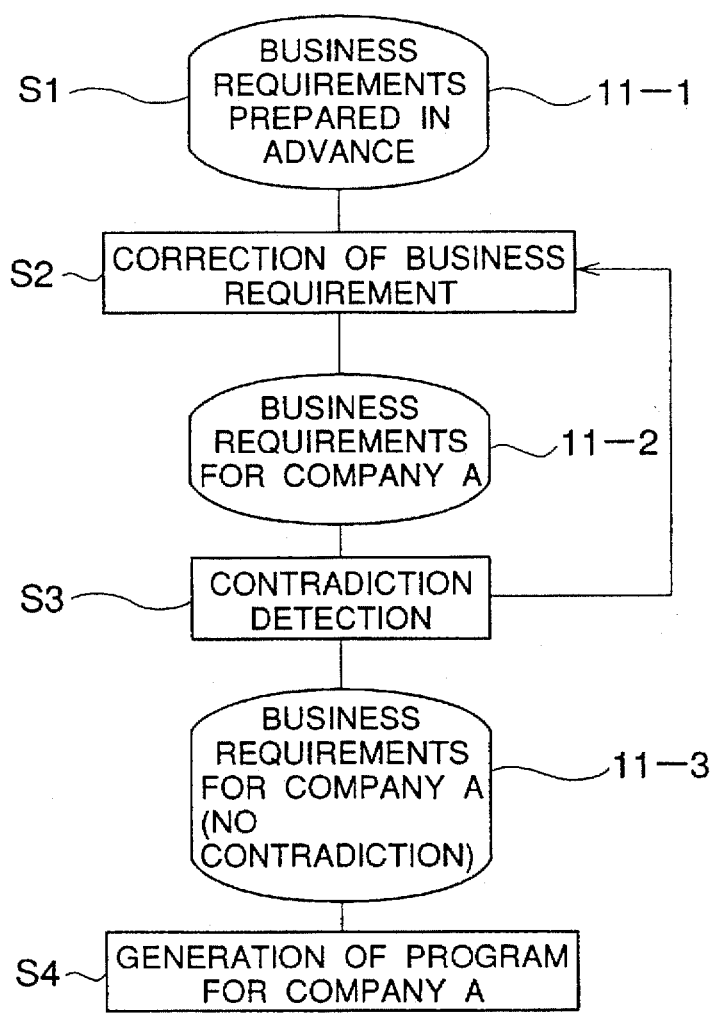
FIG. 3 is a flow chart for explaining the general process of the embodiment of the business requirement handling apparatus.

A description will now be given of the general process of this embodiment, the use of this embodiment, by referring to FIG. 3. In the following description, S1 through S4 respectively correspond to processes S1 through S4 shown in FIG. 3.

Process S1: A business requirement database 11-1 which is made by system development by a company, or a business requirement database considered standard in the particular business, is prepared.

Process S2: The business requirements of a customer (company A) are analyzed, and the business requirements of the business requirement database 11-1 are corrected so as to make a business requirement database 11-2 for the company A.

Process S3: The contradictions among the requirements introduced by the correction of the business requirements are detected and notified to the user. The user returns to the process S2 and corrects the business requirements if contradictions are detected in the requirements. This operation is repeated until no contradiction is detected.

Process S4: Information for matching (or suiting) a contradiction-free business requirement database 11-3 for the company A to the environment (conditions of the hardware, operating system and the like) of the company A is added to the business requirement data base 11-3. In addition, information (control logic) indicating which requirements are to be executed and in which sequence the requirements are to be executed is added to the business requirement database 11-3. As a result, a business program for the company A is generated.

Figure 4:
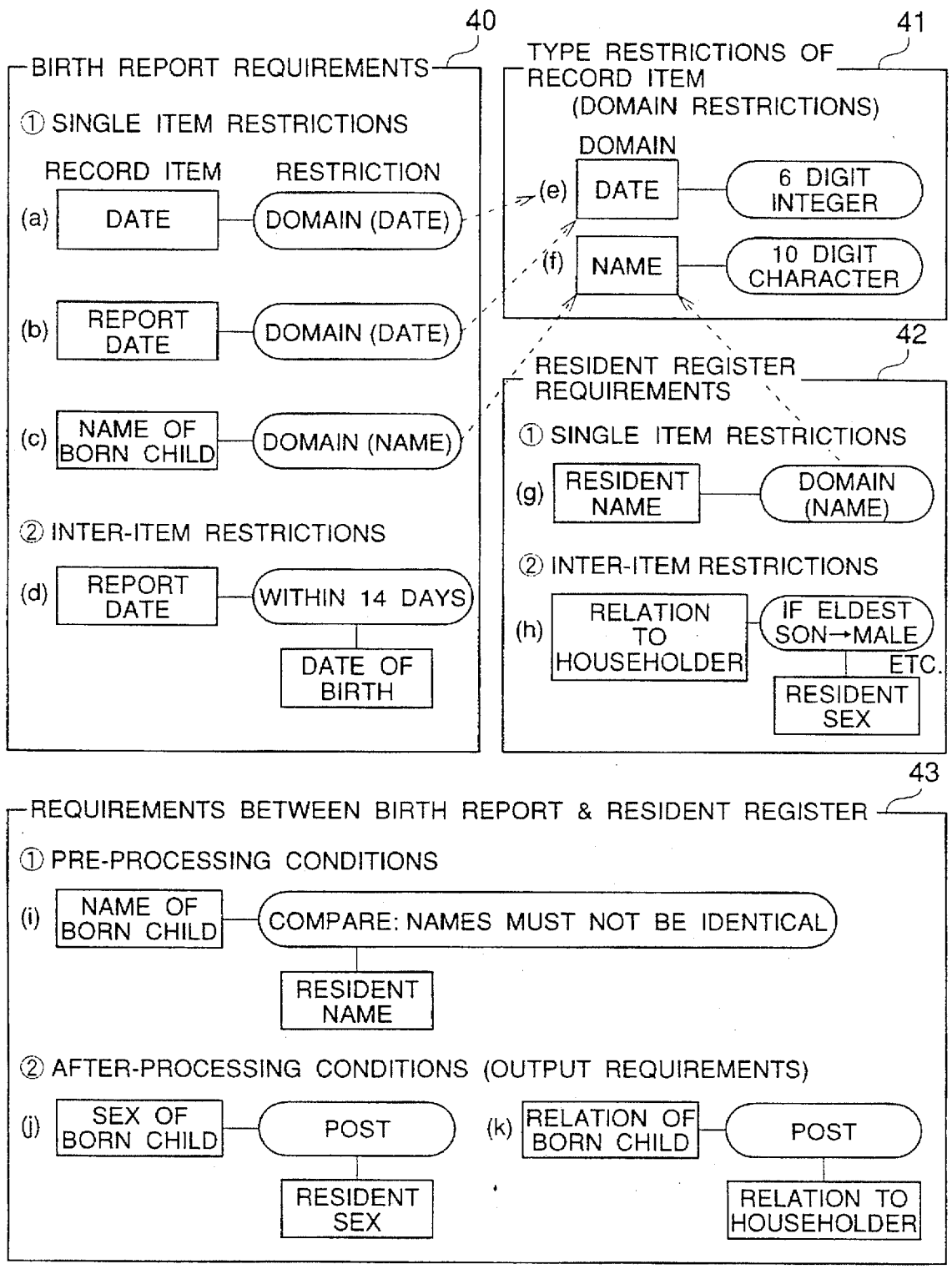
FIG. 4 is a diagram for explaining the structure of the business requirement database and the mechanism of contradiction detection of the embodiment of the business requirement handling apparatus.

FIG. 4 is a diagram for explaining the structure of the business requirement database and the mechanism of the contradiction detection in this embodiment. For the sake of convenience, a description will be given for the case where the business concerns the business of the municipal office. Hence, it will be assumed that the "birth report" record and a "resident register" record exist as the records.

As restrictions with respect to the record items of a birth report requirements 40, there are single item restrictions and inter-item restrictions. The record items "date" and "report date" both inherit the restrictions of the domain (date). The record item "name of born child" inherits the restrictions of the domain (name). In addition, the "report date" is given an inter-item restriction which is inherent between the items "within 14 days" from "birth date".

Domain restrictions 41 which are type restrictions of the record items, are given a 6 digit integer restriction with respect to the date and a 10 digit character restriction with respect to the name.

In resident register requirements 42, the record item "resident name" inherits the restrictions of the domain (name). As inter-item restrictions, there are such restrictions as a restriction which restricts "resident sex" to "male" if "relation to householder" is "eldest son", for example.

In requirements 43 between the birth report and the resident register, "name of born child" in the record item "birth report" and "resident name" in "resident register" are compared, for example, and the condition "names are not identical" is added as a preprocessing condition. In this case, it is assumed that a plurality of family members by the identical name are not permitted within the same family. Posting "sex of born child" to the "resident sex" of the "resident register" and posting "relation of born child" to the "relation to householder" of the "resident register" are added as after-processing conditions (output requirements).

As described above, the inside of the business requirement database has as the basic structure the records ("birth report", "resident register"), the record items ("report date", "relation to householder", etc.) which form the records, and the domains ("date", "name").

With respect to each of these data types, and among the data types, the restrictions and process (calculation) expressions are given as indicated by (a) through (k) in FIG. 4 depending on a predetermined grammar. The relation among the requirements in (a) through (k) has the data type name throughout.

Because the structure described above is employed, it becomes possible to detect the following contradictions, for example.

First, it can be detected that a contradiction exists if the two record items "name of born child" and "resident name" used in a requirement "compare" indicated by (i) in FIG. 4 refer to different domains.

Second, when the "sex of born child" and "relation of born child" are respectively posted to the "resident sex" and the "relation to householder" in the output requirements (j) and (k) in FIG. 4, the restriction (h) exists, and thus, it can be detected that a contradiction exists if the restriction (h) does not appear as the pre-processing condition in the "sex of born child" and the "relation of born child".

Next, a description will be given of the particular process flow and operation of the various parts.

Figures 5A, 5B:
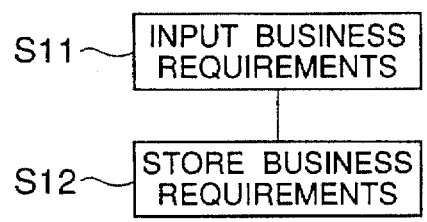
FIGS. 5A and 5B respectively are diagrams for explaining a business requirement editing process of the embodiment of the business requirement handling apparatus.

FIGS. 5A and 5B are diagrams for explaining the business requirement editing process of this embodiment.

First, by a process S1 shown in FIG. 5A, the business requirement editing process means 12 inputs the business requirements specified by the user depending on the form (table format) displayed on the screen of the display unit 17. When the input ends and a storage instruction is received from the user, a process S12 stores the form into the business requirement database 11. In doing so, the grammatical errors in the requirements are checked, and if grammatical errors exist, the errors are notified to the user without storing the requirements into the business requirement database 11, so as to urge the user to correct the grammatical errors.

For example, when inputting the check requirements for "birth report" by the input made in the process S11, the input is made from a screen 50 shown in FIG. 5B in this embodiment. In this screen 50, an underlined portion indicates the portion which is being input by the user. The user describes the restrictions and the conditions that stand between the sex of the born child and the relation to the householder, and the restriction indicating that the report date is within 14 days from the birth date.

Figure 6A:
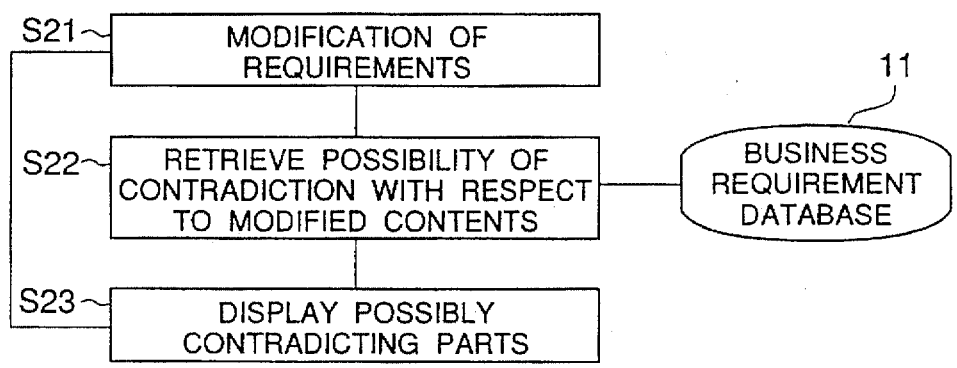
FIGS. 6A and 6B respectively are diagrams for explaining a contradiction detecting process of the embodiment of the business requirement handling apparatus.

The contradiction detection process is carried out as shown in FIG. 6A, for example.

First, a process S21 shown in FIG. 6A corrects and modifies the business requirements by the business requirement editing process means 12 in response to the instructions from the user.

Second, a process S22 retrieves a requirement which may be contradictory by retrieving a related portion within the business requirement database 11 from the content which is modified by the business requirement.

Third, a process S23 displays the contradicting requirements or the requirements which may be contradictory, for confirmation by the user.

Figure 6B:
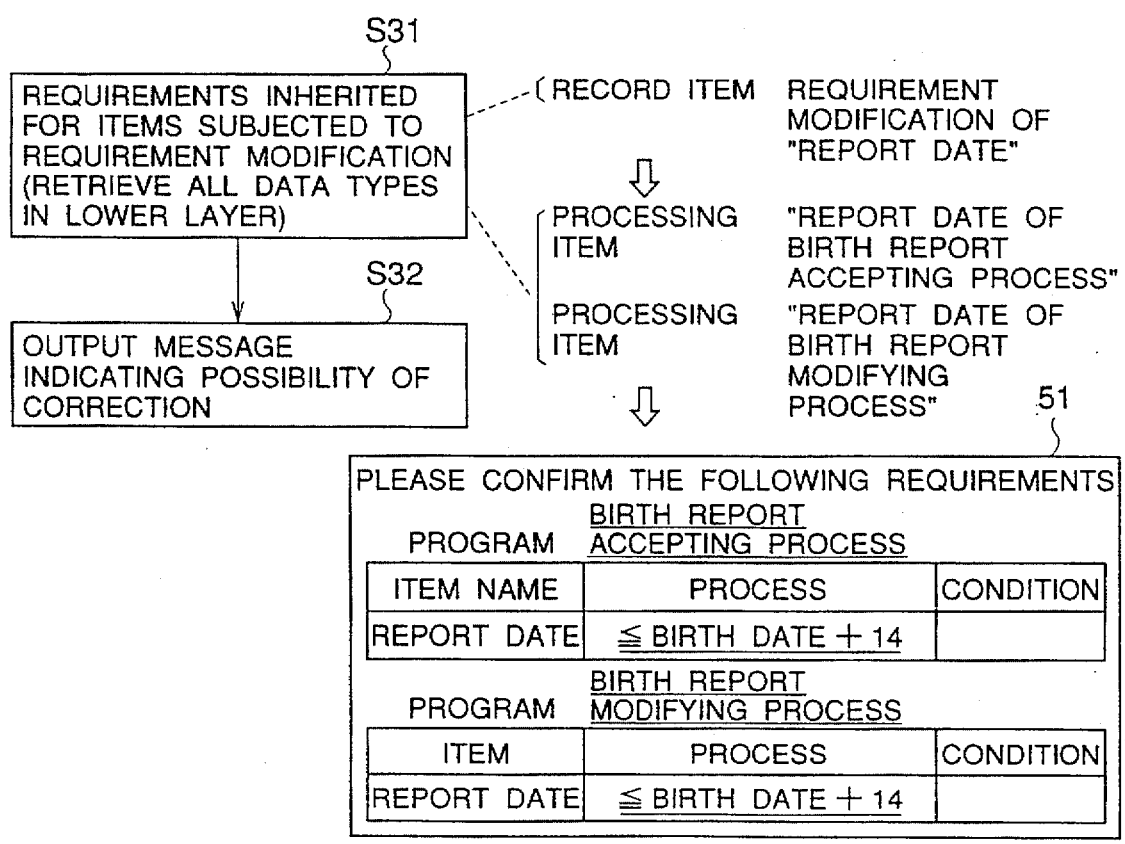

When the requirements of the record items are modified, the operation becomes as follows. As shown in FIG. 6B, if it is assumed that the requirements of the record item "report date" is modified, the processing items "report date of birth report accepting process" and "report date of birth report modifying process" which inherit the requirements of the record item "report date" are affected.

Accordingly, with respect to the items subjected to the requirement modification, a process S31 shown in FIG. 6B retrieves all lower layer data types which inherit the requirements. A process S32 outputs a message indicating the possibility of correction as indicated by a screen 51, for the results of the retrieval made in the process S31. Not only such low-degree contradictions are detected, but also the contradictions of the higher-degree are detected as described above with reference to FIG. 4.

Figure 7:
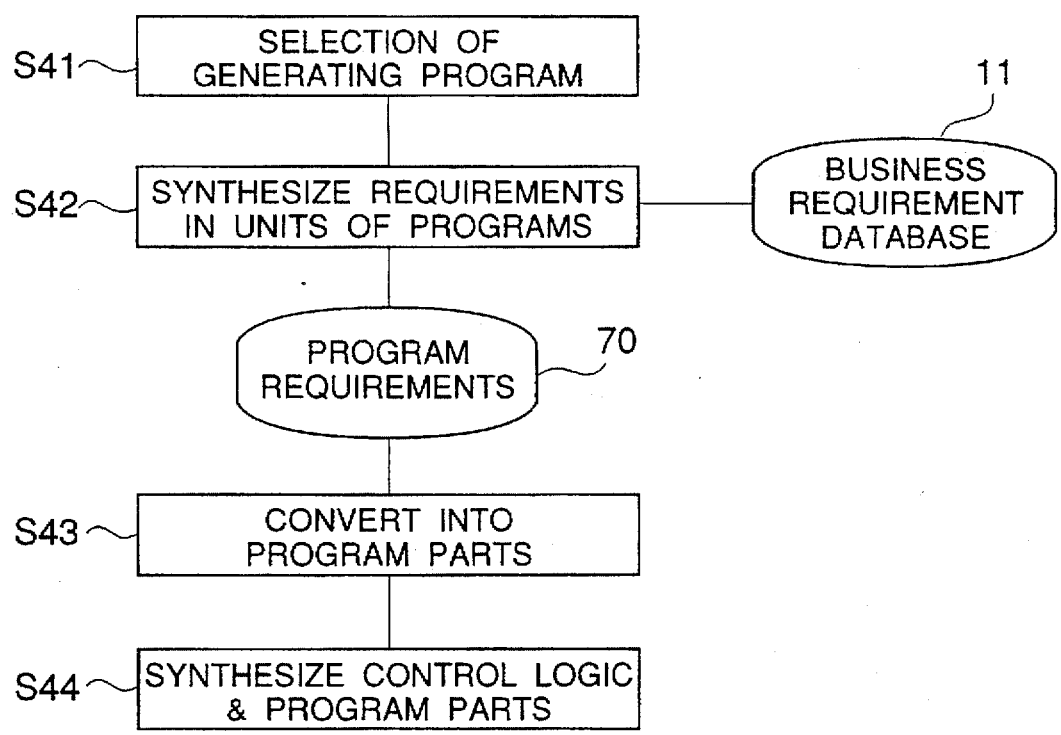
FIG. 7 is a flow chart for explaining a program synthesizing process of the embodiment of the business requirement handling apparatus.

FIG. 7 shows a program synthesizing process.

In a process S41 shown in FIG. 7, the program synthesizing process means 14 inputs a generation instruction from the user and inputs a program name of the program which is to be generated.

A process S42 retrieves the business requirement database 11, and extracts the processing items related to the specified program and the requirements of these processing items. At the same time, the process 42 forms program requirements 70 by extracting and synthesizing the requirements to be inherited from the requirements of the record items and the domains.

A process S43 converts the program requirements 70 which are formed for each item into program parts.

A process S44 inputs the control logic within the program from the user, and inputs the logic for calling the program parts from the-control logic. One program is generated by synthesizing the control logic and the program parts.

Figure 9:
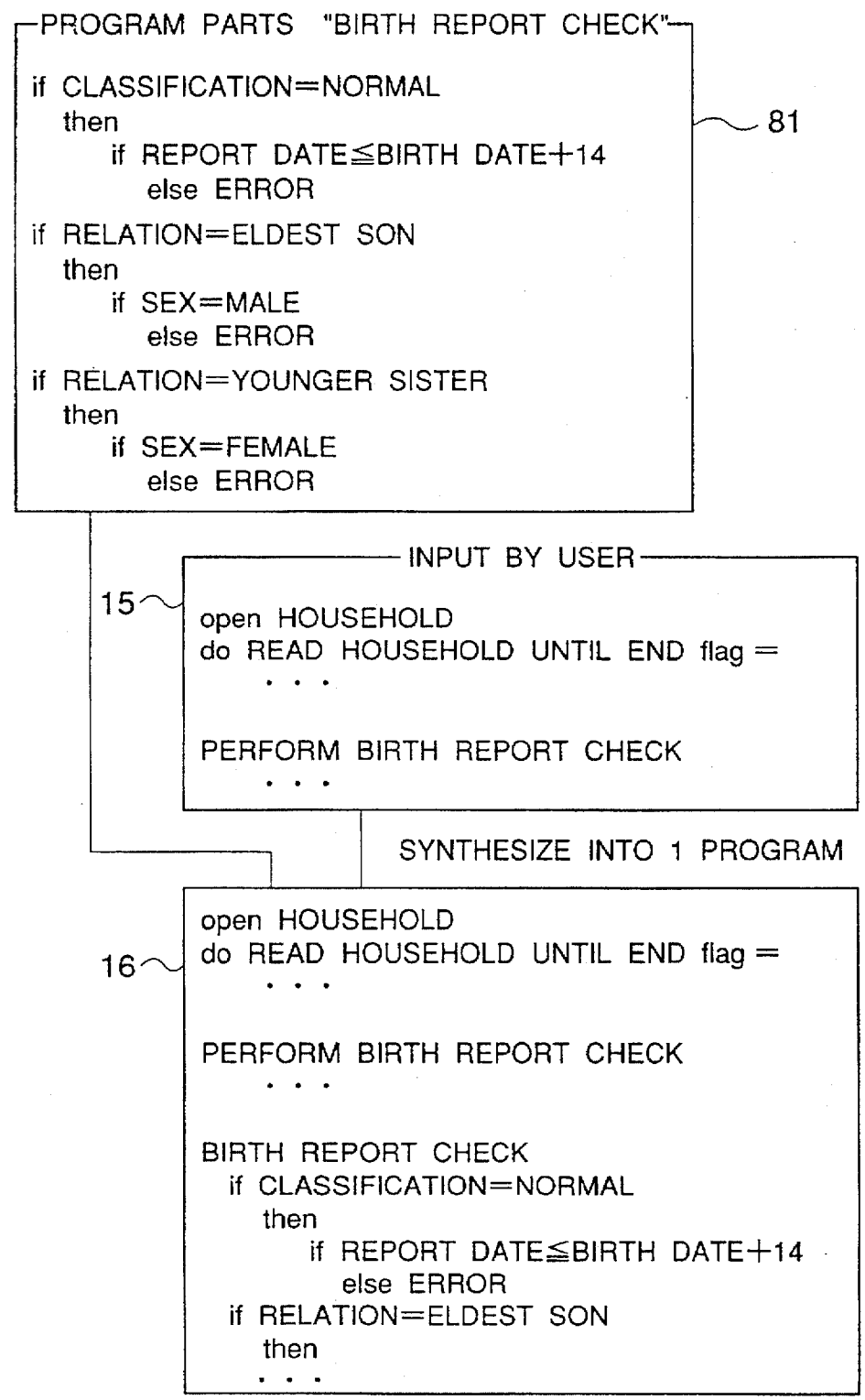
FIG. 9 is a diagram showing a synthesized program obtained by synthesizing a control logic and the program parts.

FIG. 8 is a diagram for explaining a conversion of the requirements of each item into the program parts, and FIG. 9 is a diagram showing a synthesized program obtained by synthesizing the control logic and the program parts.

For example, in "birth report check" requirements 80 shown in FIG. 8, the item "report date" has a restriction "within 14 days from birth date" exists if "classification= normal". In addition, "sex" has a restriction "male" if "relation=eldest son" exists, and a restriction "female" if "relation=younger sister" exists. Such requirements 80 can be converted into program parts 81 having a "if . . . , then . . . , else . . . " format.

When synthesizing the program, the program parts 81 formed from the requirements are combined with the control logic 15 input by the user, as shown in FIG. 9. In the control logic 15, the program parts 81 are called by a PERFORM statement, for example, so as to determine the sequence of the processes to be executed depending on the requirements. Accordingly, it is possible to generate a program which is executable in the user environment, as in the case of the business program 15 shown in FIG. 9.

Further, the present invention is not limited to these embodiments, but various variations and modifications may be made without departing from the scope of the present invention.

What is claimed is:

1. A business requirement handling apparatus, comprising:

a business requirement database to accumulate and manage business requirements of businesses to be programmed, the business requirements described as attributes with respect to data types which include domains, record items and processing items as three kinds of abstractions, the domains being common data types used in common by the record items and not being modified by record types, the record items being modified by the data types but not being modified by processes, the processing items indicating a relation as to when the record items are processed in a program and being modified by the processes;

business requirement editing unit to edit business requirements, and to store edited business requirements in said business requirement database in units of the data types;

a contradiction detection unit to detect whether a contradiction exists among the business requirements stored in said business requirement database based on attributes including at least one of a restricting expression, a calculation expression and a conditional expression annexed to the record items of the business requirements, and to notify a user of a content of the contradiction when the contradiction is detected; and program synthesizing process means for generating program parts from the requirements of each record item based on the business requirements stored in said business requirement database, and for generating a business program which is executable in a user environment by synthesizing the program parts with a given control logic.

2. A method for processing a business transaction, comprising:

creating a schema and a database of objects conforming to said schema, said schema describing requirements of a business transaction, said schema having descriptors such as attributes with respect to data types which include domains, record items and processing items having three kinds of abstractions, the domains being common data types used in common by the record items and not being modified by record types, the record items being modified by the data types but not being modified by processes, the processing items indicating a relation as to when the record items are processed in a program and being modified by the processes;

creating a schema instantiation by entering requirements of the business transaction to form a representation within said schema of the business transaction modeled by individual data types and relations;

detecting whether a contradiction exists in the representation of the business transaction based on the attributes including at least one of a restricting expression, a calculation expression and a conditional expression of the representation of the business transaction and notifing a user of a content of the contradiction when the contradiction is detected; and generating program parts based on the representation of the business transaction stored in said business requirement database to create a business program which is executable in a user environment by synthesizing the program parts with a given control logic.

3. A business requirement handling apparatus adapted to a data processing system which includes a central processing unit, a display unit and an input unit, said business requirement handling apparatus comprising:

a business requirement database accumulating and managing business requirements of businesses to be programmed depending on a structure which indicates predetermined data types and relations thereof;

business requirement editing process means for displaying business requirements, which are described in units of individual data types, on the display unit to carry out an editing process, and for storing edited business requirements in said business requirement database in units of the individual data types, each of said business requirements being described in the form of a restricting expression which restricts input data if a processing content is made up of input items, described in the form of a calculation expression for obtaining output data if the processing content is made up of output items, and added with a conditional expression if a necessary condition exists, said business requirements described by attributes, including the restricting expression, the calculation expression or the conditional expressions, which are annexed to record items of a record used in programs and are modified by data types but are not modified by processes, domains which are common data types used in common by the record items and are not modified by record types, and processing items which indicate the relation as to when the record items are processed in a certain program and are modified by process record types;

contradiction detecting process means for detecting whether a contradiction exists, among the business requirements stored in said business requirement database based on the attributes including the restricting expression, the calculation expression or the conditional expression annexed to the record items of the business requirements, and for notifying a user of a content of the contradiction when the contradiction is detected; and program synthesizing process means for generating program parts from the requirements of each record item based on the business requirements stored in said business requirement database, and for generating a business program which is executable in a user environment by synthesizing the program parts with a given control logic.

4. The business requirement handling apparatus as claimed in claim 3, wherein said control logic indicates which business requirements are to be executed and in which sequence the business requirements are to be executed.

5. The business requirement handling apparatus as claimed in claim 4, which further comprises means for inputting said control logic.

6. The business requirement handling apparatus as claimed in claim 3, wherein said attributes are nonprocedural annexed to the data type which forms a basic structure within said business requirement database.

7. The business requirement handling apparatus as claimed in claim 3, wherein:

the domains, the record items and the processing items conceptually represent an abstract data type in this sequence;

the attributes of the requirements annexed to the domain are inherited to the record items and the processing items existing in a lower layer; and the attributes of the requirements annexed to the record items are inherited to the processing items existing in the lower layer.

* * * * *

UNITED STATES PATENT AND TRADEMARK OFFICE
CERTIFICATE OF CORRECTION

PATENT NO. : 5,745,878
DATED : April 28, 1998
INVENTOR(S) : Keiji HASHIMOTO et al.

It is certified that error appears in the above-identified patent and that said Letters Patent is hereby corrected as shown below:

Col. 1, line 11, delete "-".

Col. 5, line 28, change "14Days" to --14 Days--.

Col. 10, line 20, delete ",".

Signed and Sealed this

Seventeenth Day of November, 1998

Attest:

BRUCE LEHMAN

Attesting Officer    Commissioner of Patents and Trademarks